(12) United States Patent
Numata

(10) Patent No.: US 7,190,675 B2
(45) Date of Patent: Mar. 13, 2007

(54) ADAPTIVE ACCESS CONTROL IN LAN RELAYING APPARATUS

(75) Inventor: Yoshiaki Numata, Miyagi (JP)

(73) Assignee: NEC Communications Systems Ltd. (JP)

(*) Notice: Subject to any disclaimer, the term of this patent is extended or adjusted under 35 U.S.C. 154(b) by 979 days.

(21) Appl. No.: 10/294,373

(22) Filed: Nov. 14, 2002

(65) Prior Publication Data

US 2003/0091050 A1    May 15, 2003

(30) Foreign Application Priority Data

Nov. 14, 2001    (JP)    .............................. 2001-348143

(51) Int. Cl.
*G01R 31/08*    (2006.01)
(52) U.S. Cl. ...................... 370/235; 370/338; 370/412; 710/52
(58) Field of Classification Search .................... None
See application file for complete search history.

(56) References Cited

U.S. PATENT DOCUMENTS

| | | | | |
|---|---|---|---|---|
| 4,692,894 A | * | 9/1987 | Bemis ........................ | 710/57 |
| 5,406,554 A | * | 4/1995 | Parry ........................ | 370/381 |
| 5,459,839 A | * | 10/1995 | Swarts et al. ............... | 710/112 |
| 5,933,413 A | * | 8/1999 | Merchant et al. ........... | 370/234 |
| 6,105,079 A | * | 8/2000 | Kuo et al. .................. | 710/25 |
| 6,487,212 B1 | * | 11/2002 | Erimli et al. ............... | 370/413 |
| 6,977,897 B1 | * | 12/2005 | Nelson et al. .............. | 370/235 |

FOREIGN PATENT DOCUMENTS

| | | |
|---|---|---|
| JP | 6-188938 | 7/1994 |
| JP | 6-216944 | 8/1994 |
| JP | 7-114510 | 5/1995 |
| JP | 7-283817 | 10/1995 |
| JP | 8-274797 | 10/1996 |

(Continued)

OTHER PUBLICATIONS

Untranslated Office Action issued by Japanese Patent Office on Dec. 5, 2006 in connection with corresponding Japanese patent application No. 2001-348143.

(Continued)

*Primary Examiner*—Chi Pham
*Assistant Examiner*—Melanie Jagannathan
(74) *Attorney, Agent, or Firm*—Ostrolenk, Faber, Gerb & Soffen, LLP

(57) ABSTRACT

In a LAN relaying apparatus, a reception side control circuit receives a reception side write pointer from a reception side write control circuit and a reception side read pointer from a reception side read control circuit, and determines a reception side pointer difference between the side reception side write pointer and the reception side read pointer. Then, the control circuit controls the reception side read control circuit to start the second side read operation when the reception side pointer difference is equal to a reception side first threshold held therein. Subsequently, the reception side control circuit controls the reception side write control circuit and the reception side read control circuit such that the first side write operation or the second side read operation is carried out based on the reception side pointer difference, when the reception side pointer difference is not equal to the reception side first threshold after the start of the second side read operation.

20 Claims, 10 Drawing Sheets

FOREIGN PATENT DOCUMENTS

| | | |
|---|---|---|
| JP | 10-70555 | 3/1998 |
| JP | 10-224376 | 8/1998 |
| JP | 10-276224 | 10/1998 |
| JP | 2000-36839 | 2/2000 |
| JP | 2000-101676 | 4/2000 |
| JP | 2000-209250 | 7/2000 |
| JP | 2000-269997 | 9/2000 |
| JP | 2000-316035 | 11/2000 |
| JP | 2001-203705 | 7/2001 |

OTHER PUBLICATIONS

English translation of relevant portions of Japanese Office Action issued in connection with corresponding Japanese patent application No. 2001-438143 on Dec. 5, 2006.

* cited by examiner

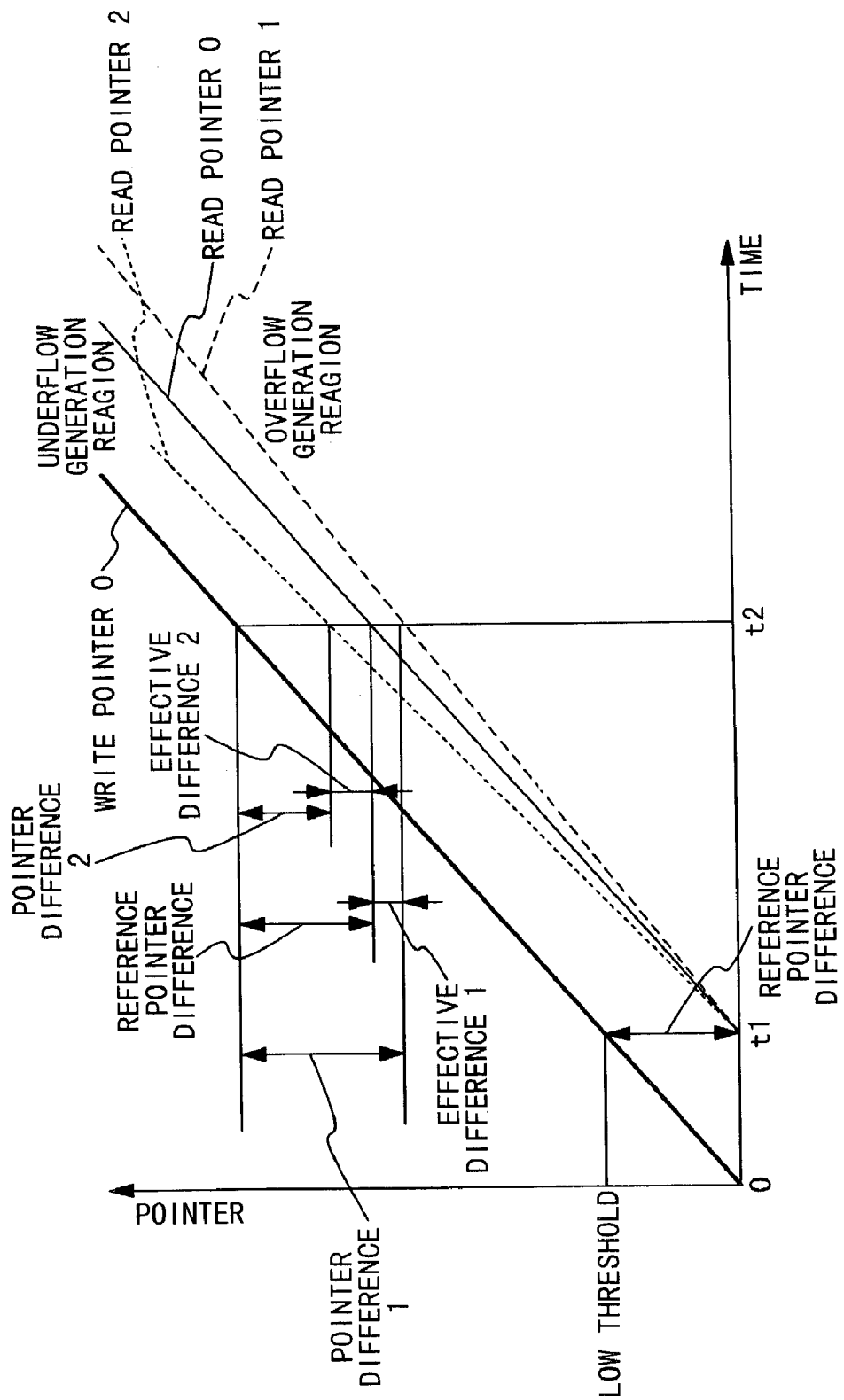

ADAPTIVE ACCESS CONTROL IN LAN RELAYING APPARATUS

BACKGROUND OF THE INVENTION

1. Field of the Invention

The present invention relates to an adaptive access control method and a LAN (Local Area Network) relaying apparatus using the same.

2. Description of the Related Art

Conventionally, a flow control method is used in a LAN relaying apparatus in order to avoid congestion on a transmission line. For example, Japanese Laid Open Patent Application (JP-P2000-269997A) discloses a technique in which a flow control is carried out from a transmission side if the congestion exceeds a preset threshold on a reception side. FIG. 1 shows the system structure of a line processing section in this conventional LAN relaying apparatus.

Referring to FIG. 1, the line processing section of the LAN relaying apparatus is composed of a reception side memory circuit 71 and a transmission side memory circuit 75. A write operation of a line reception side data input signal is carried out to the reception side memory circuit 71 in response to a reception side write control signal from a reception side write control circuit 73. Also, a read operation of a system reception side data output signal is carried out to the reception side memory circuit 71 in response to a reception side read control signal of a reception side read control circuit 74.

The reception side write control circuit 73 supplies the reception side write control signal to the reception side memory circuit 71, and supplies a reception side write pointer to a reception side fixed threshold control circuit 72. The reception side read control circuit 74 supplies the reception side read control signal to the reception side memory circuit 71, and supplies a reception side read pointer to the reception side fixed threshold control circuit 72.

A fixed threshold can be previously set into the reception side fixed threshold control circuit 72 from a micro processor interface circuit 79. A difference between the reception side write pointer of the reception side write control circuit 73 and the reception side read pointer of the reception side read control circuit 74 with the preset fixed threshold are compared with each other. If the difference is equal to or greater than the threshold, the reception side fixed threshold control circuit 72 supplies a transmission side flow control request signal to a transmission side fixed threshold control circuit 76 in order to carry out a flow control to the transmission side.

A write operation of a system transmission side data input signal is carried out to the transmission side memory circuit 75 in response to a transmission side write control signal of a transmission side write control circuit 78. Also, a read operation of a transmission side data output signal is carried out to the transmission side memory circuit 75 in response to a transmission side read control signal of a transmission side read control circuit 77. The transmission side write control circuit 78 supplies a transmission side write control signal to the transmission side memory circuit 75, and supplies a transmission side write pointer to the transmission side fixed threshold control circuit 76. The transmission side read control circuit 77 supplies a transmission side read control signal to the transmission side memory circuit 75, and supplies a transmission side read pointer to the transmission side fixed threshold control circuit 76.

A fixed threshold can previously set into the transmission side fixed threshold control circuit 76 from the micro processor interface circuit 79. A difference between the transmission side write pointer of the transmission side write control circuit 78 and the transmission side read pointer of the transmission side read control circuit 77 with a preset fixed threshold are compared with each other. If the difference is equal to or greater than the threshold, the transmission side fixed threshold control circuit 76 supplies a reception side flow control request signal to the reception side fixed threshold control circuit 72, in order to carry out a flow control to the reception side. Also, the transmission side fixed threshold control circuit 76 outputs a pause frame to a line transmission side in response to a transmission side flow control request signal supplied from the reception side fixed threshold control circuit 72.

However, the above-mentioned conventional LAN relaying apparatus uses only the preset fixed thresholds. Thus, if a normal access cannot be carried out due to a clock skew between the line side and the system side or a queuing process on the system side, it is impossible to attain an adaptive operation to the normal access.

Also, the conventional LAN relaying apparatus only has an object to prevent the congestion occurring in a part of a transmission line from being spread to other normal transmission lines. Thus, the congestion avoiding control is fixed.

In conjunction with the above description, a flow control method between ATM-LAN node is disclosed in Japanese Laid Open Patent Application (JP-A-Heisei 7-283817). In this conventional example, whether the number of cells in a buffer of the node exceeds a predetermined threshold value is checked. If the number of cells exceeds the threshold value, a cell transmission prohibition cell is sent to a node on the upper stream side to carry out a flow control between the adjacent nodes. In the cell transmission prohibition state, when the number of cells in the buffer is less than the threshold value, a cell transmission prohibition cancel cell is sent to the upper stream node to permit the transmission of the cells from the upper stream node.

Also, a data communication method is disclosed in Japanese Laid Open Patent Application (JP-P-Heisei 10-70555). In this conventional example, the data communication method is used in a communication system with a switching system and port cards, each of which has a buffer or is connected to a buffer. The buffer is adaptive to be connected with or is incorporated in the switching system. The buffer has a buffer occupation percentage defined as a ratio of the number of memory locations which can be used to store input data in the buffer and a total of the memory locations in the buffer. A plurality of priority data flows inputted to and outputted from the port card are controlled. The plurality of priority data are of a plurality of data types which includes a first data type that has a first priority and a second data type that has a second priority lower than the first priority. The first data type contains a first priority bit stream and the second data type has a second priority bit stream. The transmission of all the second priority bit streams to the port card which has a buffer occupation percentage higher than a second threshold value which is higher than a first threshold value is set to a non-operation state. The transmission of the second priority bit stream to the port card is set to an operable state when the buffer occupation percentage falls below the first threshold value. The transmission of all the first priority bit streams to the port card which has a buffer occupation percentage higher than a fourth threshold value which is higher than a third threshold value which is higher than the second threshold value is set to a non-operation state. The transmission of the second priority bit stream to the port card is set to an operable state when the buffer occupation percentage falls below the first threshold value.

Also, a bi-directional routing switch for a digital signal is disclosed in Japanese Laid Open Patent Application (JP-A-Heisei 10-224376). In this conventional example, the routing switch routs a digital signal containing some digital signal cells of two types at least. The first type requests the consistence of the cell transmission but admits a variable bit rate transmission. The second type admits that some of transmitted cells are lost. The routing switch is composed of a plurality of input ports to receive input cells, and an output ports to output the output cells. A buffer circuit is connected with the input ports and the output ports and holds a plurality of cells of the respective types before the cells are outputted from the output port after being received from the input ports. The buffer has a first buffer capacity for the first type of cells and a second buffer capacity for the second type of cells. A control circuit determines whether each input cell is of the first type or of the second type. The control circuit stores the input cells of the first type in the first buffer capacity when the number of input cells reaches a predetermined value, and sets a state in which a flow control signal is selected, to block the input cells of the first type. In addition, the control circuit stores the input cells of the second type in the second buffer capacity when the number of input cells of the second type does not reach the predetermined value, and discards the input cells of the second type when the number of input cells of the second type reaches the predetermined value.

Also, a switching hub is disclosed in Japanese Laid Open Patent Application (JP-A-Heisei 10-276224). In this conventional example, the switching hub is composed of a plurality of ports, a buffer provided in common to the plurality of ports or for every port, to store transfer data temporarily, a network interface section which is connected with each of the ports to carry out a communication control, and a switching section which selectively switches the connection of the buffer and the network interface section. A plurality of threshold values are set step-by-step in accordance with a data quantity in the buffer, and a transmission stop time is set for every threshold value. A data quantity monitoring section stops the transmission for the transmission stop time each time the data quantity exceeds one of the plurality of threshold values.

Also, a flow control method is disclosed in Japanese Laid Open Patent Application (JP-P2000-36839). In this conventional example, a data communication network has a plurality of data traffic sources which are interconnected with a transmission link. In order to avoid congestion in a flow control node, the flow of the data traffic through the above flow control node from the source is controlled. The traffic which passes the above flow control node is monitored to detect a congestion state. The source of the traffic contributing to the above congestion is distinguished in response to the detection of the congestion state, and a temporary stop time is calculated for which the distinguished source stops the transmission to the flow control node. The calculated temporary stop time is varied by a random quantity, and a temporary stop command containing the varied temporary stop time is transmitted to the distinguished source.

Also, a flow control circuit is disclosed in Japanese Laid Open Patent Application (JP-P2001-203705A). In this conventional example, the flow control circuit is composed of a reception buffer which holds receive data, an empty buffer region calculating section which calculates an empty space in the reception buffer, an upper limit value holding section holding an upper limit value of the empty quantity of the reception buffer, and a minimum value holding section holding a minimum value of the empty quantity of the reception buffer. A mode switching value holding section holds a mode switching value to switch a data transmission mode from a back pressure method to a credit method. A flow control data generating section outputs a flow control data to a transmission side to carry out the data transmission in the back pressure method when the calculated empty space region is in the range between the upper limit and the low limit. The flow control data generating section outputs the flow control data to the transmission side to carry out the data transmission in the credit method when the calculated empty space region reaches the mode switching value, until the empty quantity of the reception buffer reaches the upper limit.

SUMMARY OF THE INVENTION

Therefore, an object of the present invention is to provide an adaptive access control method and a LAN relaying apparatus using the same, in which an adaptive access control to a memory circuit can be carried out.

Another object of the present invention is to provide an adaptive access control method and a LAN relaying apparatus using the same, in which a stable memory access control can be carried out.

In an aspect of the present invention, a LAN relaying apparatus includes a reception side memory circuit, a reception side write control circuit, and a reception side read control circuit. Data is written from a first side into the reception side memory circuit based on a reception side write control signal and is read out from the reception side memory circuit to a second side based on a reception side read control signal. The reception side write control circuit has a reception side write pointer to the reception side memory circuit and outputs the reception side write control signal to the reception side memory circuit for a first side write operation. The reception side read control circuit has a reception side read pointer to the reception side memory circuit and outputs the reception side read control signal to the reception side memory circuit for a second side read operation. The reception side control circuit receives the reception side write pointer from the reception side write control circuit and the reception side read pointer from the reception side read control circuit, and determines a reception side pointer difference between the side reception side write pointer and the reception side read pointer. Then, the reception side control circuit controls the reception side read control circuit to start the second side read operation when the reception side pointer difference is equal to a reception side first threshold held therein. Subsequently, the reception side control circuit controls at least one of the reception side write control circuit and the reception side read control circuit such that at least one of the first side write operation and the second side read operation is carried out based on the reception side pointer difference, when the reception side pointer difference is not equal to the reception side first threshold after the start of the second side read operation.

Here, the reception side control circuit may hold a reception side second threshold larger than the reception side first threshold, and output a first side flow control request signal such that a signal corresponding to the first side flow control request signal is transmitted to the first side for a first side flow control, when the reception side pointer difference is equal to or larger than the reception side second threshold.

In this case, the reception side control circuit may have a reception side third threshold larger than the reception side second threshold, and control the reception side write control circuit and the reception side read control circuit to stop access to the reception side memory circuit when the pointer difference is equal to or larger than the reception side third threshold.

Also, the reception side control circuit may provide a pause frame such that the pause frame is transmitted to the second side.

Also, the reception side control circuit may control only the reception side write control circuit when the reception side pointer difference is not equal to the reception side first threshold after the start of the second side read operation.

Instead, the reception side control circuit may control only the reception side read control circuit when the reception side pointer difference is not equal to the reception side first threshold after the start of the second side read operation.

Otherwise, the reception side control circuit may control both of the reception side write control circuit and the reception side read control circuit when the reception side pointer difference is not equal to the reception side first threshold after the start of the second side read operation.

Also, the reception side control circuit may include a comparing circuit, a holding circuit and a reception side adaptive control circuit. The comparing circuit compares the reception side write pointer and the reception side read pointer to determine the reception side pointer difference. The holding circuit holds the reception side first to third thresholds. The reception side adaptive control circuit controls at least one of the reception side write control circuit and the reception side read control circuit when the reception side pointer difference is not equal to the reception side first threshold after the start of the second side read operation such that at least one of the first side write operation and the second side read operation is carried out based on the reception side pointer difference. Also, the reception side adaptive control circuit outputs the first side flow control request signal such that the signal corresponding to the first side flow control request signal is transmitted to the first side, when the pointer difference is equal to or larger than the reception side second threshold, and controls the reception side write control circuit and the reception side read control circuit to stop access to the reception side memory circuit when the pointer difference is equal to or larger than the reception side third threshold.

Also, the reception side control circuit may further include a reception side flow control circuit which generates a second side flow control instruction signal from a second side flow control request signal supplied thereto. In this case, the reception side adaptive control circuit writes the signal corresponding to the second side flow control instruction signal in the reception side memory circuit such that the signal corresponding to the second side flow control instruction signal is transmitted to the second side.

Also, the reception each of the reception side first to third thresholds is desirably variable.

Also, the LAN relaying apparatus may further include a transmission side memory circuit, a transmission side write control circuit, a transmission side read control circuit and a transmission side control circuit. Data is written into the transmission side memory circuit from the second side based on a transmission side write control signal and the data is read out to the first side based on a transmission side read control signal. The transmission side write control circuit has a transmission side write pointer to the transmission side memory circuit and which outputs the transmission side write control signal to the transmission side memory circuit for a second side write operation. The transmission side read control circuit has a reception side read pointer to the transmission side memory circuit and which outputs the transmission side read control signal to the transmission side memory circuit for a first side read operation. The transmission side control circuit receives the transmission side write pointer from the transmission side write control circuit and the transmission side read pointer from the transmission side read control circuit, and determines a transmission side pointer difference between the side transmission side write pointer and the transmission side read pointer. The transmission side control circuit controls the transmission side read control circuit to start the first side read operation when the transmission side pointer difference is equal to a transmission side first threshold held therein. Then, the transmission side control circuit controls at least one of the transmission side write control circuit and the transmission side read control circuit such that at least one of the second side write operation and the first side read operation is carried out based on the transmission side pointer difference, when the transmission side pointer difference is not equal to the transmission side first threshold after the start of the first side read operation.

Also, the transmission side control circuit may hold a transmission side second threshold larger than the transmission side first threshold, and output a second side flow control request signal such that a signal corresponding to the second side flow control request signal is transmitted to the second side for a second side flow control, when the transmission side pointer difference is equal to or larger than the transmission side second threshold.

Also, the transmission side control circuit may have a transmission side third threshold larger than the transmission side second threshold, and control the transmission side write control circuit and the transmission side read control circuit to stop access to the transmission side memory circuit when the pointer difference is equal to or larger than the transmission side third threshold.

Also, the transmission side control circuit may provide a pause frame such that the pause frame is transmitted to the first side.

Also, the transmission side control circuit may control only the transmission side write control circuit when the transmission side pointer difference is not equal to the transmission side first threshold after the start of the first side read operation.

Instead, the transmission side control circuit may control only the transmission side read control circuit when the transmission side pointer difference is not equal to the transmission side first threshold after the start of the first side read operation.

Otherwise, the transmission side control circuit may control both of the transmission side write control circuit and the transmission side read control circuit when the transmission side pointer difference is not equal to the transmission side first threshold after the start of the first side read operation.

Also, the transmission side control circuit may include a comparing circuit, a holding circuit, and a transmission side adaptive control circuit. The comparing circuit compares the transmission side write pointer and the transmission side read pointer to determine the transmission side pointer difference. The holding circuit holds the transmission side first to third thresholds. The transmission side adaptive control circuit controls at least one of the transmission side write control circuit and the transmission side read control circuit when the transmission side pointer difference is not equal to the transmission side first threshold after the start of the first side read operation such that at least one of the first side write operation and the second side read operation is carried out based on the transmission side pointer difference. Also, the transmission side adaptive control circuit outputs the first side flow control request signal such that the signal corresponding to the second side flow control request signal is transmitted to the second side, when the pointer difference is equal to or larger than the transmission side second threshold. Then, the transmission side adaptive control circuit controls the transmission side write control circuit and the transmission side read control circuit to stop access to the transmission side memory circuit when the pointer difference is equal to or larger than the transmission side third threshold.

Also, the transmission side control circuit may further include a transmission side flow control circuit which generates a first side flow control instruction signal from a first side flow control request signal supplied thereto. At this time, the transmission side adaptive control circuit writes the signal corresponding to the first side flow control instruction signal in the transmission side memory circuit such that the signal corresponding to the first side flow control instruction signal is transmitted to the first side.

Also, the transmission each of the transmission side first to third thresholds is desirably variable.

BRIEF DESCRIPTION OF THE DRAWINGS

FIG. 7 is a timing chart showing a read pointer adaptation control of the LAN relaying apparatus according to the first embodiment of the present invention;

DESCRIPTION OF THE PREFERRED EMBODIMENT

Hereinafter, a LAN relaying apparatus of the present invention will be described below with reference to the attached drawings.

Figure 1:
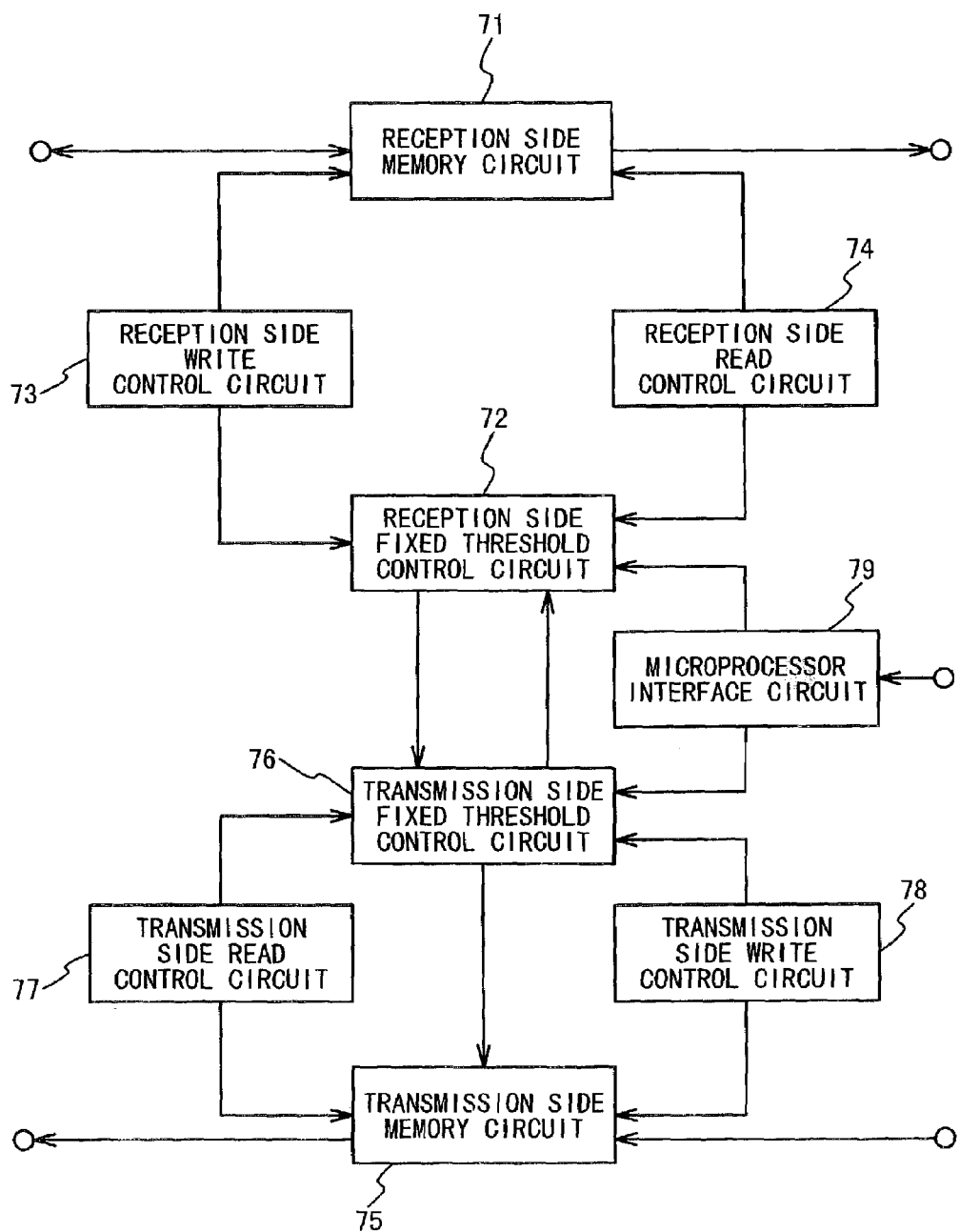
FIG. 1 is a block diagram showing the structure of a line processing section of a LAN relaying apparatus in a conventional example.
Figure 2:
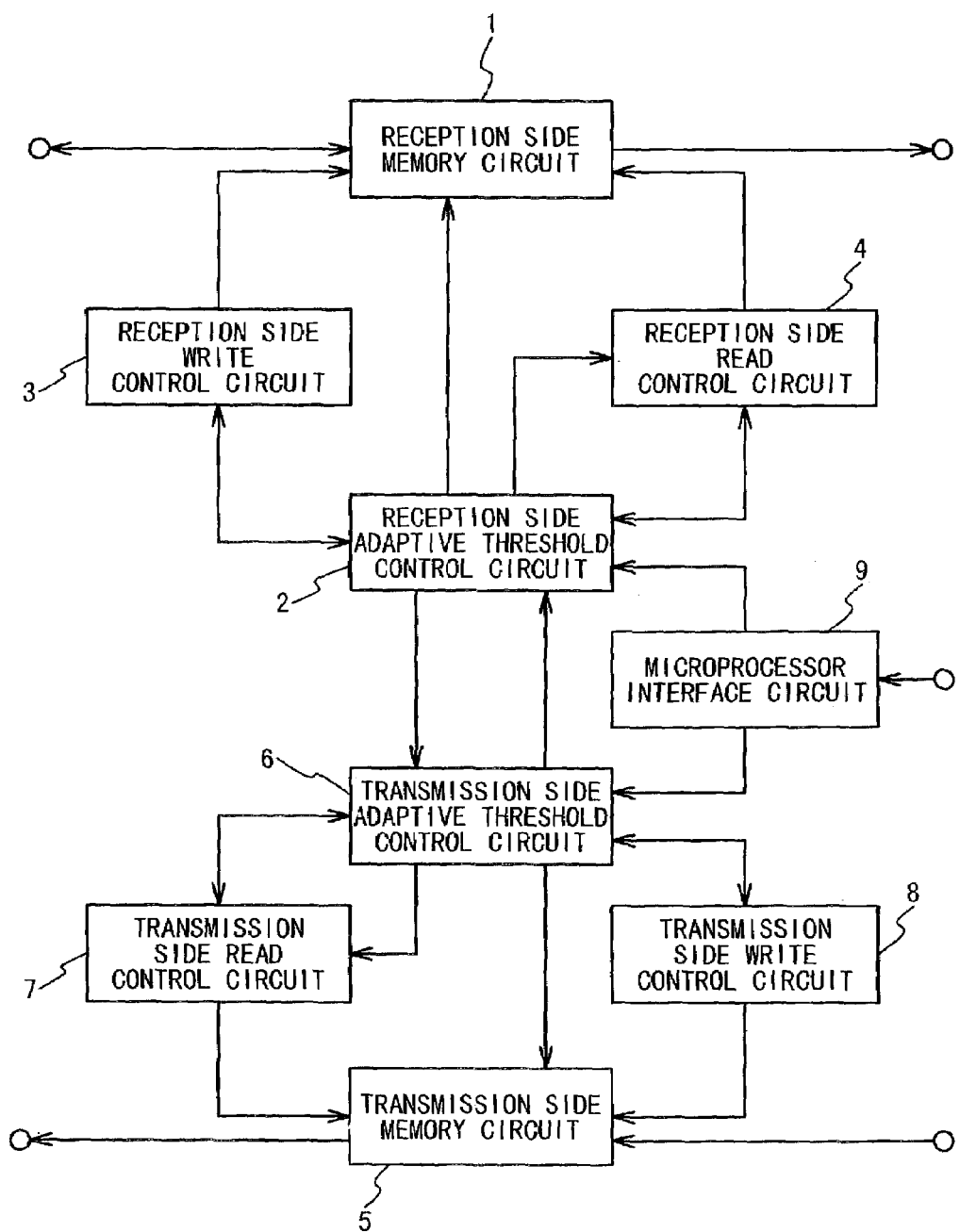
FIG. 2 is a block diagram showing the structure of a line processing section of a LAN relaying apparatus according to a first embodiment of the present invention.

FIG. 2 is a block diagram showing the structure of a line processing section of a LAN relaying apparatus according to the first embodiment of the present invention. Referring to FIG. 2, the line processing section of the LAN relaying apparatus according to the first embodiment of the present invention is composed of a reception side memory circuit 1, a reception side adaptation threshold control circuit 2, a reception side write control circuit 3, a reception side read control circuit 4, a transmission side memory circuit 5, a transmission side adaptation threshold control circuit 6, a transmission side read control circuit 7, a transmission side write control circuit 8 and a micro processor interface circuit 9.

In the line processing section of the LAN relaying apparatus according to the first embodiment of the present invention, when a line reception side input data signal is supplied from a line side to the reception side memory circuit 1, a write operation of the line reception side input data signal is carried out to the reception side memory circuit 1 in response to a reception side write control signal supplied from the reception side write control circuit 3. The data signal written into the reception side memory circuit 1 is read out from the reception side memory circuit 1 in response to the reception side read control signal of the reception side read control circuit 4, and supplied as a system reception side data output signal to a system side.

The reception side write control circuit 3 supplies the reception side write control signal to the reception side memory circuit 1, and supplies a reception side write pointer to the reception side adaptive threshold control circuit 2. The reception side read control circuit 4 supplies the reception side read control signal to the reception side memory circuit 1, and supplies a reception side read pointer to the reception side adaptive threshold control circuit 2. The reception side adaptive threshold control circuit 2 can previously set with three kinds of reception side thresholds (a reception side low threshold, a reception side middle threshold and a reception side high threshold) from the micro processor interface circuit 9. Here, the three kinds of the reception side thresholds can be properly set through the micro processor interface circuit 9 by a micro processor (not shown) based on a state of a flow control in the line processing section of the LAN relaying apparatus, and their values can be varied.

Also, the reception side adaptive threshold control circuit 2 compares the reception side write pointer from the reception side write control circuit 3 with the reception side read pointer from the reception side read control circuit 4. If detecting the increase or a decrease from a preset reference pointer difference, the reception side adaptive threshold control circuit 2 supplies a reception side adaptive difference read control signal to the reception side read control circuit 4 in order to protect an occurrence of overflow or underflow in the reception side memory circuit 1. The three kinds of the reception side thresholds are intended to detect the increase or the decrease from the reference pointer difference. Also, the reception side adaptive threshold control circuit 2 supplies a transmission side flow control request signal to the transmission side adaptive threshold control circuit 6 in order to carry out the flow control on the line side, and a line side flow control instruction signal corresponding to the transmission side flow control request signal is transmitted from the transmission side adaptive threshold control circuit 6 to the line side through the transmission side memory circuit 5 in response to the transmission side flow control request signal. Thus, a line side access control to the reception side memory circuit 1 is carried out in accordance with the line side flow control instruction signal. Also, when receiving a reception side flow control request signal from the transmission side adaptive threshold control circuit 6, the reception side adaptive threshold control circuit 2 outputs a system side flow control instruction signal to the reception side memory circuit 1, which is transmitted to the system side. Thus, a system side access control to the transmission side memory circuit 5 is carried out in accordance with the system side flow control instruction signal.

When a system transmission side data input signal is supplied to the transmission side memory circuit 5, a write operation of the system transmission side data input signal is carried out to the transmission side memory circuit 5 in response to the transmission side write control signal supplied from the transmission side write control circuit 8. The data signal written to the transmission side memory circuit 5 is read out from the transmission side memory circuit 5 in response to the transmission side read control signal from the transmission side read control circuit 7, and is supplied as a line transmission side data output signal to the line side.

The transmission side write control circuit 8 supplies the transmission side write control signal to the transmission side memory circuit 5, and supplies a transmission side write pointer to the transmission side adaptive threshold control circuit 6. The transmission side read control circuit 7 supplies the transmission side read control signal to the transmission side memory circuit 5, and supplies a transmission side read pointer to the transmission side adaptive threshold control circuit 6.

The transmission side adaptive threshold control circuit 6 can previously set with three kinds of transmission side thresholds (a transmission side low threshold, a transmission side middle threshold and a transmission side high threshold) from the micro processor interface circuit 9. Here, the three kinds of the transmission side thresholds can be properly set through the micro processor interface circuit 9 by the micro processor (not shown) based on the state of the flow control in the line processing section of the LAN relaying apparatus, and their values can be varied.

The transmission side adaptive threshold control circuit 6 compares the transmission side write pointer from the transmission side write control circuit 8 with the transmission side read pointer from the transmission side read control circuit 7. If detecting an increase or decrease from a preset reference pointer difference, the transmission side adaptive threshold control circuit 6 supplies a transmission side adaptive difference read control signal to the transmission side read control circuit 7 in order to protect the occurrence of overflow or underflow in the transmission side memory circuit 5. The three kinds of the transmission side thresholds are intended to detect the increase or decrease from the reference pointer difference.

Also, the transmission side adaptive threshold control circuit 6 supplies the reception side flow control request signal to the reception side adaptive threshold control circuit 2 in order to carry out the flow control on the system side. In response to the reception side flow control request signal, a system side flow control instruction signal is written in the reception side memory circuit 1 by the reception side adaptive threshold control circuit 2 and transmitted to the system side. Thus, the flow control to the transmission side memory circuit 5 by the system side is carried out. Also, the transmission side adaptive threshold control circuit 6 controls a line side access to the reception side memory circuit 1 by the line side by writing the line side flow control instruction signal in the transmission side memory circuit 5 in response to the transmission side flow control request signal from the reception side adaptive threshold control circuit 2 and by transmitting it to the line side. In addition, the transmission side adaptive threshold control circuit 6 inserts a line side pause frame into the transmission side memory circuit 5, and outputs the pause frame to the line side.

Figure 3:
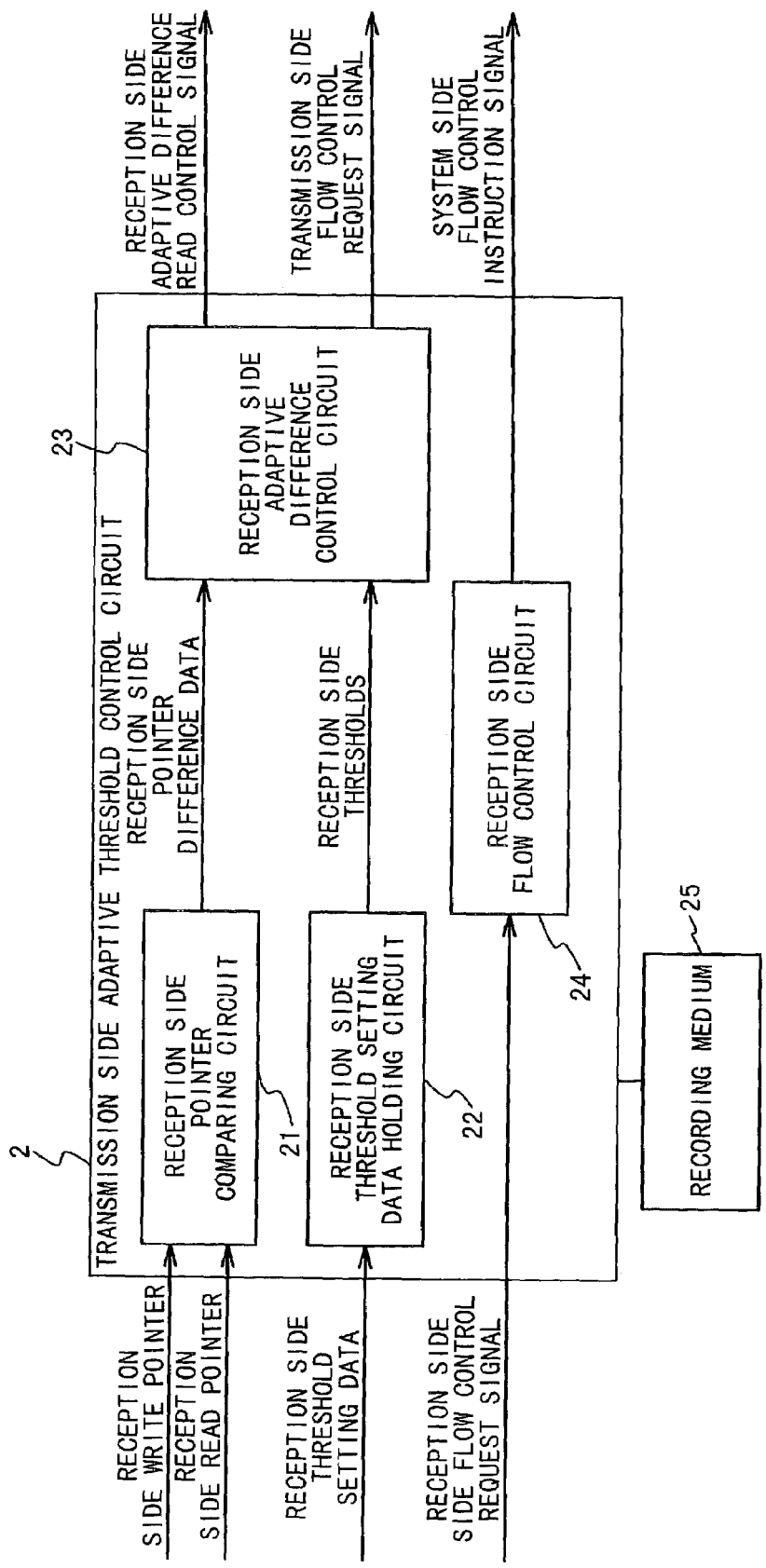
FIG. 3 is a block diagram showing the structure of a reception side adaptation threshold control circuit in the first embodiment.

FIG. 3 is a block diagram showing the structure of the reception side adaptive threshold control circuit 2. Referring to FIG. 3, the reception side adaptive threshold control circuit 2 is composed of a reception side pointer comparing circuit 21, a reception side threshold setting data holding circuit 22, a reception side adaptive difference control circuit 23 and a reception side flow control circuit 24. A recording medium 25 for storing a program to be carried out by the reception side adaptive threshold control circuit 2 is connected thereto. It should be noted that the reception side adaptive threshold control circuit 2 may be constituted by a computer. Since the computer carry outs the program on the recording medium 25, it is possible to attain the operations of the respective circuits.

The reception side pointer comparing circuit 21 compares the reception side write pointer supplied from the reception side write control circuit 3 with the reception side read pointer supplied from the reception side read control circuit 4, and supplies the compared result as a reception side pointer difference to the reception side adaptive difference control circuit 23. The reception side threshold setting data holding circuit 22 holds the threshold setting data received from the micro processor interface circuit 9, and supplies the thresholds to the reception side adaptive difference control circuit 23.

The reception side flow control circuit 24 outputs the system side flow control instruction signal to the reception side memory circuit 1 in response to the reception side flow control request signal supplied from the transmission side adaptive threshold control circuit 6. Based on the reception side pointer difference, and the reception side thresholds, the reception side adaptive difference control circuit 23 outputs the reception side adaptive difference read control signal to the reception side read control circuit 4, and the transmission side flow control request signal to the transmission side adaptive threshold control circuit 6.

Figure 4:
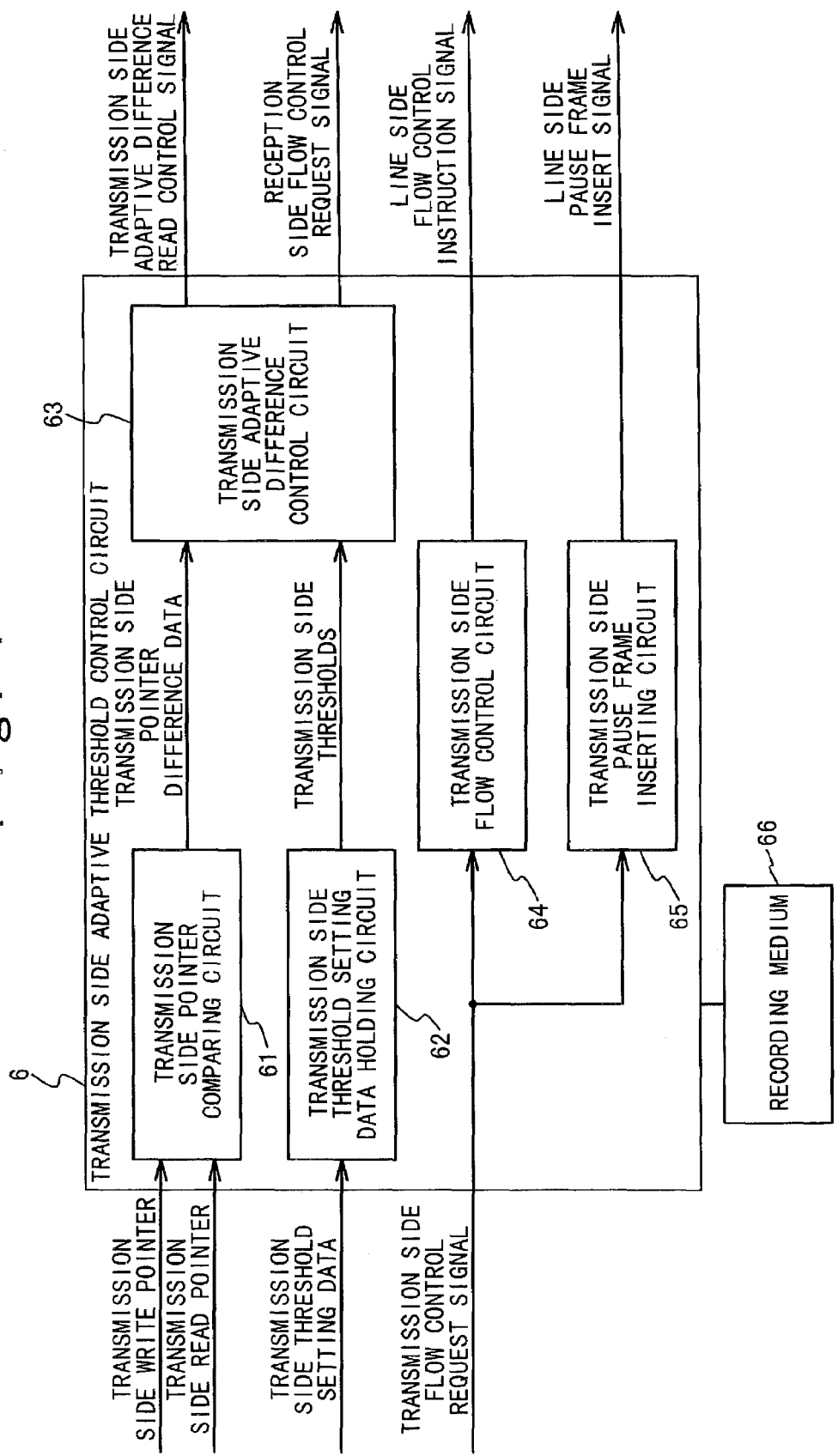
FIG. 4 is a block diagram showing the structure of a transmission side adaptation threshold control circuit in the first embodiment.

FIG. 4 is a block diagram showing the structure of the transmission side adaptive threshold control circuit 6. Referring to FIG. 4, the transmission side adaptive threshold control circuit 6 is composed of a transmission side pointer comparing circuit 61, a transmission side threshold setting data holding circuit 62, a transmission side adaptive difference control circuit 63, a transmission side flow control circuit 64, and a transmission side pause frame inserting circuit 65. A recording medium 66 for storing a program to be carried out by the transmission side adaptive threshold control circuit 6 is connected thereto. It should be noted that the transmission side adaptive threshold control circuit 6 may be constituted by a computer. Since the computer carry outs the program of the recording medium 66, it is possible to attain the operations of the respective circuits.

The transmission side pointer comparing circuit 61 compares the transmission side write pointer received from the transmission side write control circuit 8 with the transmission side read pointer received from the transmission side read control circuit 7, and supplies the compared result as a transmission side pointer difference to the transmission side adaptive difference control circuit 63. The transmission side threshold setting data holding circuit 62 holds the transmission side threshold setting data received from the micro processor interface circuit 9, and supplies the transmission side thresholds to the transmission side adaptive difference control circuit 63. The transmission side flow control circuit 64 supplies a line side flow control instruction signal to the transmission side memory circuit 5 in response to the transmission side flow control request signal received from the reception side adaptive threshold control circuit 2. The transmission side pause frame inserting circuit 65 supplies a transmission side pause frame to the transmission side memory circuit 5 in response to the transmission side flow control request signal received from the reception side adaptive threshold control circuit 2 to request the stop of transmission to the line side.

The transmission side adaptive difference control circuit 63 outputs the transmission side adaptive difference read control signal to the transmission side read control circuit 4 based on the transmission side pointer difference, and the transmission side threshold data.

Figure 5:
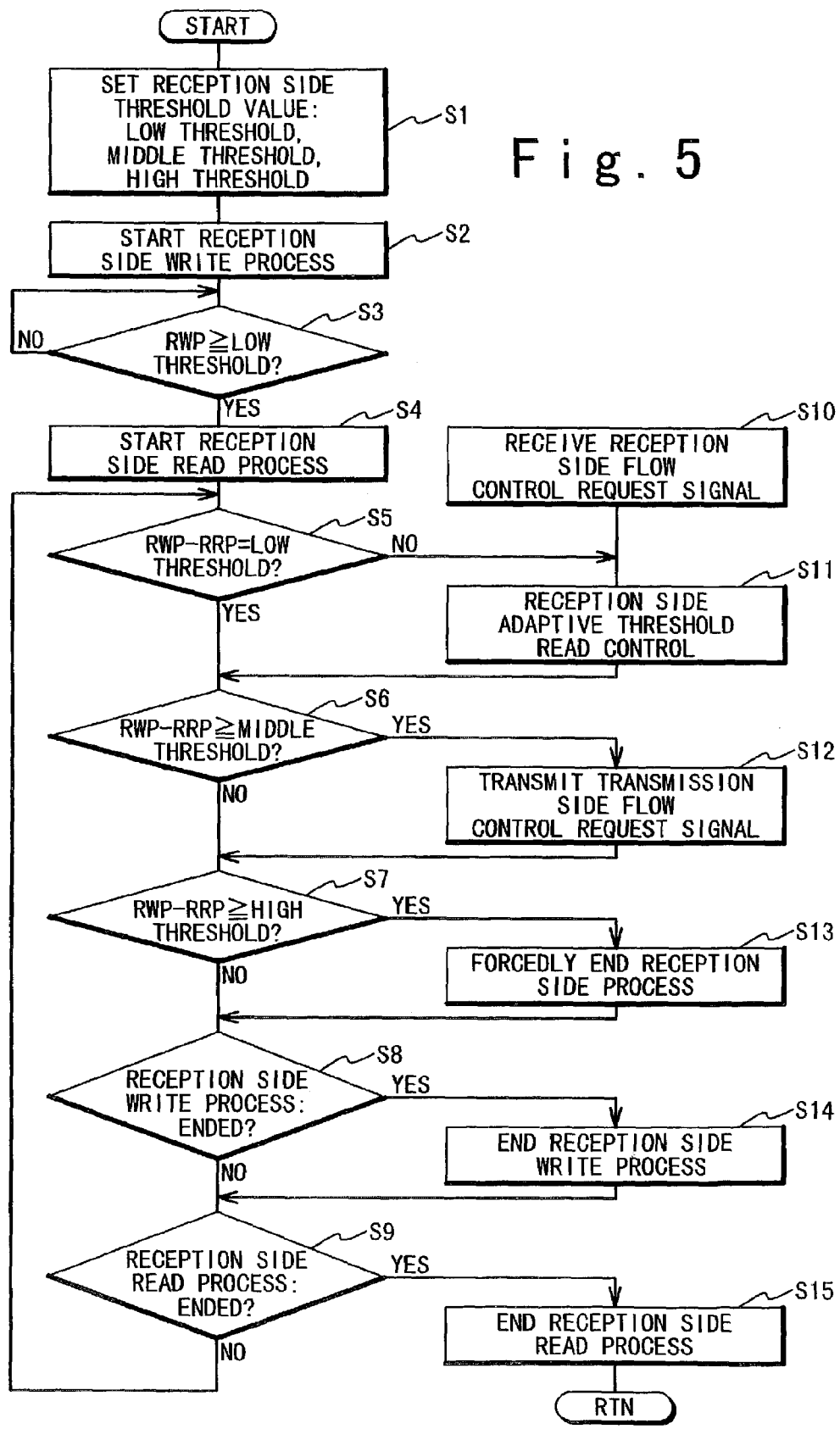
FIG. 5 is a flowchart showing a reception side flow control of the LAN relaying apparatus according to the first embodiment of the present invention.
Figure 6A:
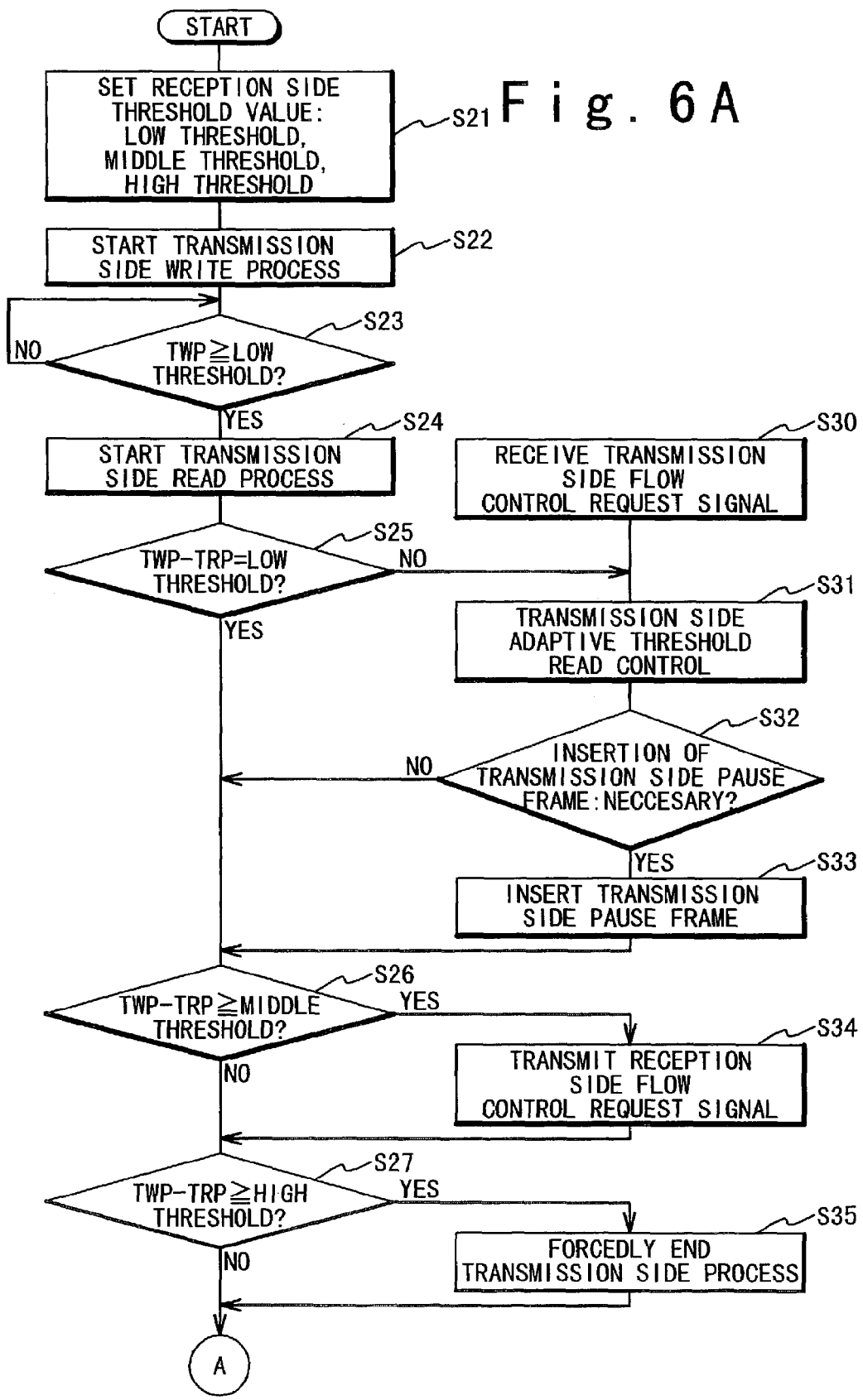
FIGS. 6A and 6B are flowcharts showing a transmission side flow control of the LAN relaying apparatus according to the first embodiment of the present invention.
Figure 6B:
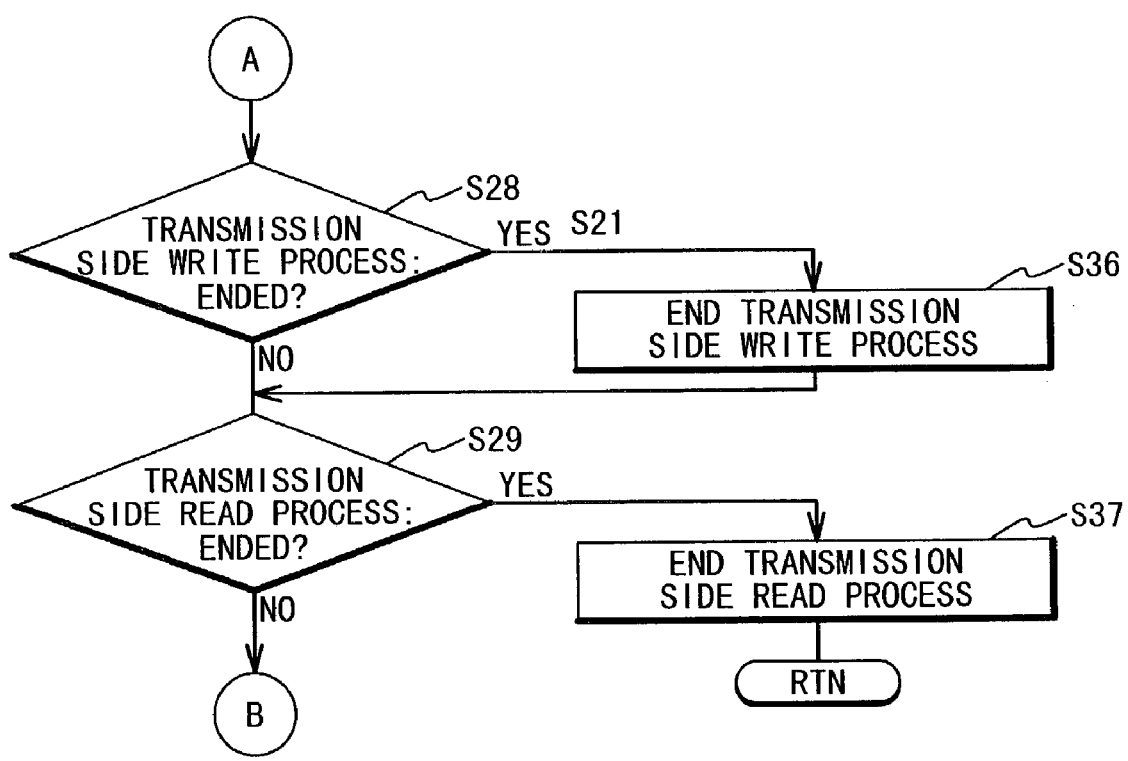

FIG. 5 is a flowchart showing the reception side flow control of the LAN relaying apparatus according to the first embodiment of the present invention. FIGS. 6A and 6B are flowcharts showing the transmission side flow control of the LAN relaying apparatus according to the first embodiment of the present invention. FIG. 7 is a timing chart showing the read pointer adaptation control of the LAN relaying apparatus according to the first embodiment of the present invention. The adaptive flow control operation of the LAN relaying apparatus according to the first embodiment of the present invention will be described below with reference to FIGS. 2 to 7.

At first, the operation of the reception side will be described. The three kinds of the reception side thresholds (the reception side low threshold, the reception side middle threshold and the reception side high threshold) serving as the references of the reception side operation are preliminarily set in the reception side adaptive threshold control circuit 2 from the micro processor interface circuit 9 (Step S1 of FIG. 5). The line reception side input data signal supplied to the reception side memory circuit 1 is written to the reception side memory circuit 1 in response to the write control signal of the reception side write control circuit 3, and the reception side write pointer (RWP) is supplied from the reception side write control circuit 3 to the reception side adaptive threshold control circuit 2 (Step S2 of FIG. 5).

The reception side adaptive threshold control circuit 2 compares the supplied reception side write pointer RWP with the reception side low threshold (Step S3 of FIG. 5). If the reception side write pointer RWP is equal to or greater than the reception side low threshold, the reception side adaptive threshold control circuit 2 starts the read process on the reception side. In this case, read start data on the reception side is supplied from the reception side adaptive threshold control circuit 2 to the reception side read control circuit 4. The reception side read control signal is supplied from the reception side read control circuit 4 to the reception side memory circuit 1, and a system reception side output data signal is read from the reception side memory circuit 1. The reception side read pointer (RRP) is supplied from the reception side read control circuit 4 to the reception side adaptive threshold control circuit 2 (Step S4 of FIG. 5).

The reception side adaptive threshold control circuit 2 compares the difference (RWP–RRP) between the input reception side write pointer RWP and the reception side read pointer RRP with the reception side low threshold (Step S5 of FIG. 5). If the difference (RWP–RRP) between the reception side write pointer RWP and the reception side read pointer RRP is equal to the reception side low threshold, the reception side adaptive threshold control circuit 2 carry outs the normal memory access. Then, the operation flow advances to a step S6. If the difference (RWP–RRP) between the reception side write pointer RWP and the reception side read pointer RRP is not equal to the reception side low threshold, the reception side adaptive threshold read control process is carried out (Step S11 of FIG. 5), and the operation flow proceeds to the step S6.

Here, with reference to FIG. 7, in case of the write pointer 0, a write operation is started from a time t0. A read operation of the read pointer 0 is started at a time t1 when the reception side write pointer RWP is equal to or greater than the reception side low threshold. The reception side pointer difference (RWP–RRP) between the reception side read pointer and the reception side write pointer at the time t1 is a reception side difference reference pointer.

If a write operation rate and a read operation rate are always equal to each other, this situation implies a stable situation in which the overflow and underflow do not occur (the inclinations of the write pointer 0 and the read pointer 0 are equal to each other). However, the write operation rate and the read operation rate are not always equal to each other because of a clock skew between the line side and the system side and a queuing process on the system side. For example, in case of the read pointer 1, since the read operation rate is smaller than the write operation rate and the storage area of the memory is finite, the overflow necessarily occurs (the write pointer gets ahead of the read pointer). On the other hand, in case of the read pointer 2, since the read operation rate is larger than the write operation rate, the underflow necessarily occurs (the read pointer gets ahead of the write pointer).

For these reasons, the read access is controlled so as not to bring about such problems. That is, the read access of the reception side read control circuit 4 is controlled based on an adaptive difference read control signal, using a difference pointer adaptation algorithm based on a reception side reference pointer difference pointer such that the reception side difference pointer (RWP–RRP) between the reception side write pointer and the reception side read pointer are always equal to the reception side difference reference pointer.

The reception side pointer comparing circuit 21 supplies the reception side pointer difference (RWP–RRP) between the reception side write pointer and the reception side read pointer to the reception side adaptive difference control circuit 23. The reception side threshold setting data holding circuit 22 supplies the preset reception side low threshold supplied from the micro processor interface circuit 9 to the reception side adaptive difference control circuit 23. The reception side adaptive difference control circuit 23 compares the reception side pointer difference (RWP–RRP) with the reception side low threshold, and outputs the reception side adaptive difference read control signal to the reception side read control circuit 4 so that the access rates relating to the read pointer and the write pointer on the reception side become constant.

The reception side adaptive threshold control circuit 2 compares the difference (RWP–RRP) between the reception side write pointer RWP and the reception side read pointer RRP with the reception side middle threshold (Step S6 of FIG. 5). If the pointer difference (RWP–RRP) between the reception side write pointer RWP and the reception side read pointer RRP is smaller than the reception side middle threshold, the reception side adaptive threshold control circuit 2 carries out the normal memory access (the operation flow proceeds to a step S7). If the difference (RWP–RRP) between the reception side write pointer RWP and the reception side read pointer RRP is equal to or greater than the reception side middle threshold, the reception side adaptive difference control circuit 23 outputs a transmission side flow control request signal. Thus, a line side flow control request transmission process is carried out (Step S12 of FIG. 5). Then, the operation flow proceeds to the step S7.

The reception side pointer comparing circuit 21 supplies the reception side pointer difference (RWP–RRP) between the reception side write pointer and the reception side read pointer to the reception side adaptive difference control circuit 23. The reception side threshold setting data holding circuit 22 supplies the preset reception side middle threshold supplied from the micro processor interface circuit 9 to the reception side adaptive difference control circuit 23. The reception side adaptive difference control circuit 23 compares the reception side pointer difference (RWP–RRP) with the reception side middle threshold, and outputs the transmission side flow control request signal to the transmission side adaptive threshold control circuit 6, in order to protect the overflow from occurring in the reception side memory circuit 1. The reception side adaptive threshold control circuit 2 compares the difference (RWP–RRP) between the reception side write pointer RWP and the reception side read pointer RRP with the reception side high threshold (Step S7 of FIG. 5). If the difference (RWP–RRP) between the reception side write pointer RWP and the reception side read pointer RRP is smaller than the reception side high threshold, the reception side adaptive threshold control circuit 2 carries out the normal memory access (the operation flow proceeds to a step S8). If the difference (RWP–RRP) between the reception side write pointer RWP and the reception side read pointer RRP is equal to or greater than the reception side high threshold, a line side compulsive end process is carried out (Step S13 of FIG. 5). Then, the operation flow proceeds to a step S8.

The reception side pointer comparing circuit 21 supplies the reception side pointer difference (RWP–RRP) between the reception side write pointer and the reception side read pointer to the reception side adaptive difference control circuit 23. The reception side threshold setting data holding circuit 22 supplies the preset reception side high threshold supplied from the micro processor interface circuit 9 to the reception side adaptive difference control circuit 23. The reception side adaptive difference control circuit 23 compares the reception side pointer difference (RWP–RRP) with the reception side high threshold. If the reception side pointer difference (RWP–RRP) is equal to or greater than the reception side high threshold, the reception side adaptive difference control circuit 23 outputs a reception side adaptive difference read compulsive end signal to the reception side read control circuit 4, such that the overflow is caused in the reception side memory circuit 1 so that the read access to the reception side memory circuit 1 by the reception side read control circuit 4 is forcedly stopped.

The reception side adaptive threshold control circuit 2 checks the end of the reception side write process (Step S8 of FIG. 5), and carries out the normal memory access if the reception side write process is not ended (the operation flow proceeds to a step S9). If the reception side write process is ended, a reception side write end process is carried out (Step S14 of FIG. 5). Then, the operation flow proceeds to the step S9.

The reception side adaptive threshold control circuit 2 checks the end of the reception side read process (Step S9 of FIG. 4), and carries out the normal memory access if it is not ended (the operation flow proceeds to the step S5). If it is ended, a reception side read ending process is carried out (Step S15 of FIG. 4). Then, the reception side memory access is ended.

Also, when receiving the reception side flow control request signal, the reception side adaptive threshold control circuit 2 carries out a reception side adaptive threshold read control process in order to carry out the reception side flow control (Step S11 of FIG. 5). Then, the operation flow proceeds to the step S6.

When receiving the reception side flow control request signal from the transmission side adaptive threshold control circuit 6 to the reception side adaptive threshold control circuit 2, the reception side flow control circuit 24 supplies the system side flow control instruction signal to the reception side memory circuit 1 in order to carry out the system side flow control. In the case of the normal reception side read access, the reception side read control signal is supplied from the reception side read control circuit 4 to the reception side memory circuit 1, and is read out as the system reception side output data signal, and the reception side read pointer (RRP) is supplied from the reception side read control circuit 4 to the reception side adaptive threshold control circuit 2.

In the case of the reception side read access needing the reception side adaptive threshold read process, the reception side read control signal which is adaptively controlled as necessary is supplied from the reception side read control circuit 4 to the reception side memory circuit 1, and the system reception side output data signal is read out from the reception side memory circuit 1. The reception side read pointer (RRP) is supplied from the reception side read control circuit 4 to the reception side adaptive threshold control circuit 2.

In the case of the reception side read access needing the system side flow control, the system side flow control instruction signal is supplied from the reception side adaptive threshold control circuit 4 to the reception side memory circuit 1, and is read out as the system reception side output data signal from the reception side memory circuit 1. The reception side read pointer (RRP) is supplied from the reception side read control circuit 4 to the reception side adaptive threshold control circuit 2.

In the case of the reception side read access needing the reception side compulsive end process, a reception side read control signal for carrying out a compulsive end on the reception side is supplied from the reception side adaptive threshold control circuit 2 to the reception side read control circuit 4, and the reception side read access is forcedly ended.

Next, the operation of the transmission side will be described below. The three kinds of the transmission side thresholds (the transmission side low threshold, the transmission side middle threshold and the transmission side high threshold) serving as the reference of the transmission side operation are preliminarily set in the transmission side adaptive threshold control circuit 6 by the micro processor interface circuit 9 (Step S21 of FIG. 6A).

The system transmission side input data signal inputted to the transmission side memory circuit 5 is written to the transmission side memory circuit 5 by the write control signal of the transmission side write control circuit 8, and the transmission side write pointer (TWP) is supplied from the transmission side write control circuit 8 to the transmission side adaptive threshold control circuit 6 (Step S22 of FIG. 6A).

The transmission side adaptive threshold control circuit 6 compares the input transmission side write pointer TWP with the transmission side low threshold (Step S23 of FIG. 6A). If the transmission side write pointer TWP is equal to or greater than the transmission side low threshold, the transmission side adaptive threshold control circuit 6 starts the read process on the transmission side.

Read start data on the transmission side is supplied from the transmission side adaptive threshold control circuit 6 to the transmission side read control circuit 7. The transmission side read control signal is supplied from the transmission side read control circuit 7 to the transmission side memory circuit 5, and a line transmission side output data signal is read out from the transmission side memory circuit 5. The transmission side read pointer (TRP) is supplied from the transmission side read control circuit 7 to the transmission side adaptive threshold control circuit 6 (Step S24 of FIG. 6A).

The transmission side adaptive threshold control circuit 6 compares the difference (TWP−TRP) between the input transmission side write pointer TWP and the transmission side read pointer TRP with the transmission side low threshold (Step S25 of FIG. 6A). The transmission side adaptive threshold control circuit 6 carries out the normal memory access if the difference (TWP−TRP) between the transmission side write pointer TWP and the transmission side read pointer TRP is equal to the transmission side low threshold (the operation flow proceeds to a step S26). If the difference (TWP−TRP) between the transmission side write pointer TWP and the transmission side read pointer TRP is not equal to the transmission side low threshold, the transmission side adaptive threshold read control process is carried out (Step S31 of FIG. 6A). Then, it is judged whether or not a transmission side pause frame inserting process is needed (Step S32 of FIG. 6A). Here, if it is judged that the transmission side pause frame inserting process is not needed, the operation flow proceeds to the step S26. If it is judged that the transmission side pause frame inserting process is needed when the transmission side flow control request signal is supplied from the reception side adaptive threshold control circuit 2 to the transmission side adaptive threshold control circuit 6, the line side pause frame insert signal is outputted from the transmission side adaptive threshold control circuit 6 to the transmission side memory circuit 5, and then the pause frame is read out and transmitted to the line side. Subsequently, the operation flow proceeds to the step S26.

With reference to FIG. 7, in case of the write pointer 0, a write operation is started from a time t0. A read operation of the read pointer 0 is started at a time t1 when the transmission side write pointer TWP is equal to or greater than the transmission side low threshold. The transmission side pointer difference (TWP−TRP) between the transmission side read pointer and the transmission side write pointer at this time t1 becomes a transmission side difference reference pointer.

If a write operation rate and a read operation rate are always equal to each other, this situation implies a stable situation in which the overflow and underflow do not occur (the inclinations of the write pointer 0 and the read pointer 0 are equal to each other).

However, the write operation rate and the read operation rate are not always equal to due to clock skew between the line side and the system side and a queuing process on the system side. For example, in case of the read pointer 1, if the read operation rate is slower than the write operation rate and the storage area of the memory if finite, the overflow necessarily occurs (the write pointer gets ahead of the read pointer).

On the other hand, in case of the read pointer 2, if the read operation rate is faster than the write operation rate, the underflow necessarily occurs (the read pointer gets ahead of the write pointer). The read access is controlled so as not to bring about such problems. Thus, the access of the transmission side read control circuit 7 is controlled based on the adaptive difference read control signal using a difference pointer adaptation algorithm from a transmission side reference pointer difference pointer in such a manner that the transmission side pointer difference (TWP−TRP) between the transmission side write pointer and the transmission side read pointer always coincide with the transmission side reference pointer difference.

The transmission side pointer comparing circuit 61 supplies the transmission side pointer difference (TWP−TRP) between the transmission side write pointer and the transmission side read pointer to the transmission side adaptive difference control circuit 63. The transmission side threshold setting data holding circuit 62 supplies the preset transmission side low threshold supplied from the micro processor interface circuit 9 to the transmission side adaptive difference control circuit 63. The transmission side adaptive difference control circuit 63 compares the transmission side pointer difference (TWP−TRP) with the transmission side low threshold. The transmission side adaptive difference control circuit 63 outputs the transmission side adaptive difference read control signal to the transmission side read control circuit 7 so that the access rates of the read pointer and write pointer on the transmission side become constant.

The transmission side adaptive threshold control circuit 6 compares the difference (TWP−TRP) between the input transmission side write pointer TWP and the transmission side read pointer TRP with the transmission side middle threshold (Step S26 of FIG. 6A). The transmission side adaptive threshold control circuit 6 carries out the normal memory access if the difference (TWP−TRP) between the transmission side write pointer TWP and the transmission side read pointer TRP is smaller than the transmission side middle threshold (the operation flow proceeds to a step S27). If the difference (TWP−TRP) between the transmission side write pointer TWP and the transmission side read pointer TRP is equal to or greater than the transmission side middle threshold, the reception side flow control request signal is outputted from the transmission side adaptive threshold control circuit 6 to the reception side adaptive threshold control circuit 2. The reception side flow control instruction signal is written into the reception side memory circuit 1 by the reception side adaptive threshold control circuit 2 in response to the reception side flow control request signal, and is read out to the system side. In this way, a system side flow control process is carried out (Step S34 of FIG. 6A). Then, the operation flow proceeds to the step S27.

The transmission side pointer comparing circuit 61 supplies the transmission side pointer difference (TWP−TRP) between the transmission side write pointer and the transmission side read pointer to the transmission side adaptive difference control circuit 63. The transmission side threshold setting data holding circuit 62 supplies the preset transmission side middle threshold from the micro processor interface circuit 9 to the transmission side adaptive difference control circuit 63.

The transmission side adaptive difference control circuit 63 compares the transmission side pointer difference (TWP−TRP) with the transmission side middle threshold. The transmission side adaptive difference control circuit 63 outputs the reception side flow control request signal to the reception side adaptive threshold control circuit 2, in order to protect the overflow from occurring in the transmission side memory circuit 5.

The transmission side adaptive threshold control circuit 6 compares the difference (TWP−TRP) between the input transmission side write pointer TWP and the transmission side read pointer TRP with the transmission side high threshold. The transmission side adaptive threshold control circuit 6 carries out the normal memory access if the difference (TWP–TRP) between the transmission side write pointer TWP and the transmission side read pointer TRP is less than the transmission side high threshold (the operation flow proceeds to a step S28 of FIG. 6B). If the difference (TWP–TRP) between the transmission side write pointer TWP and the transmission side read pointer TRP is equal to or greater than the transmission side high threshold, a transmission side compulsive end process is carried out (Step S35 of FIG. 6A). The operation flow proceeds to the step S28 of FIG. 6B. The transmission side pointer comparing circuit 61 supplies the transmission side pointer difference (TWP–TRP) between the transmission side write pointer and the transmission side read pointer to the transmission side adaptive difference control circuit 63. The transmission side threshold setting data holding circuit 62 supplies the preset transmission side high threshold from the micro processor interface circuit 9 to the transmission side adaptive difference control circuit 63.

The transmission side adaptive difference control circuit 63 compares the transmission side pointer difference (TWP–TRP) with the transmission side high threshold. The transmission side adaptive difference control circuit 63 outputs a transmission side adaptive difference read compulsive end signal to the transmission side read control circuit 7, in order to generate the overflow in the transmission side memory circuit 5. The transmission side adaptive threshold control circuit 6 checks the end of the transmission side write process (Step S28 of FIG. 6B). The transmission side adaptive threshold control circuit 6 carries out the normal memory access if it is not ended (the operation flow proceeds to a step S29). If it is ended, a transmission side write end process is carried out (Step S36 of FIG. 6B). The operation flow proceeds to the step S29.

The transmission side adaptive threshold control circuit 6 checks the end of the transmission side read process (Step S29 of FIG. 6B), and carries out the normal memory access if it is not ended (the operation flow proceeds to the step S25 of FIG. 6A). If it is ended, a transmission side read end process is carried out (Step S37 of FIG. 6B). Then, the transmission side memory access is ended.

Also, when receiving the transmission side flow control request signal (Step S30 of FIG. 6A), the transmission side adaptive threshold control circuit 6 carries out a transmission side adaptive threshold read control process (Step S31 of FIG. 6A). Then, the transmission side adaptive threshold control circuit 6 judges whether or not the transmission side pause frame inserting process is needed (Step S32 of FIG. 6A). Here, when it is judged that the transmission side pause frame inserting process is needed, the transmission side pause frame inserting process is carried out (Step S33 of FIG. 6A). Then, the operation flow proceeds to the step S26.

When receiving the transmission side flow control request signal from the reception side adaptive threshold control circuit 2 to the transmission side adaptive threshold control circuit 6, the transmission side flow control circuit 64 supplies the transmission side flow control instruction signal to the transmission side memory circuit 5. The transmission side adaptive difference control circuit 63 outputs the transmission side adaptive difference read control signal to the transmission side read control circuit 7, in order to carry out the transmission side flow control. The transmission side pause frame inserting circuit 65 inserts the transmission side pause frame into the transmission side memory circuit 5, and requests the line side to stop the data transmission through the transmission side pause frame.

The transmission side adaptive difference read control signal is supplied from the transmission side adaptive threshold control circuit 6 to the transmission side read control circuit 7. In the case of the normal transmission side read access, the transmission side read control signal is supplied from the transmission side read control circuit 7 to the transmission side memory circuit 5. The line transmission side output data signal is read out from the transmission side memory circuit 5. Then, the transmission side read pointer (TRP) is supplied from the transmission side read control circuit 7 to the transmission side adaptive threshold control circuit 6.

In the case of the transmission side read access needing the transmission side adaptive threshold read process, the transmission side read control signal, which is adaptively controlled as necessary, is supplied from the transmission side read control circuit 7 to the transmission side memory circuit 5. The line transmission side output data signal is read out from the transmission side memory circuit 5. Then, the transmission side read pointer (TRP) is supplied from the transmission side read control circuit 7 to the transmission side adaptive threshold control circuit 6.

In the case of the transmission side read access needing the transmission side flow control request process, the transmission side read control instruction signal is supplied from the transmission side adaptive threshold control circuit 6 to the transmission side memory circuit 5. The line transmission side output data signal is read out from the transmission side memory circuit 5. Then, the transmission side read pointer (TRP) is supplied from the transmission side read control circuit 7 to the transmission side adaptive threshold control circuit 6.

In the case of the transmission side read access receiving the transmission side flow control request signal, the transmission side pause frame insert signal for inserting the pause frame on the transmission side is supplied from the transmission side adaptive threshold control circuit 6 to the transmission side memory circuit 5. Then, the transmission side pause frame is inserted into the transmission side memory circuit 5.

In the case of the transmission side read access needing the transmission side compulsive end process, a transmission side read end control signal for executing a compulsive end on the transmission side is supplied from the transmission side adaptive threshold control circuit 6 to the transmission side read control circuit 7, and the transmission side read access is forcedly ended.

In this way, the reception side adaptive threshold control circuit 2, the transmission side adaptive threshold control circuit 6 and the transmission side pause frame inserting circuit 65 are installed in the line processing section of the LAN relaying apparatus. Therefore, it is possible to carry out the adaptive difference read access control of the memory circuit which was conventionally difficult. Moreover, it is possible to carry out the stable memory access control, and as necessary, the flow control function of the line processing section.

Figure 8:
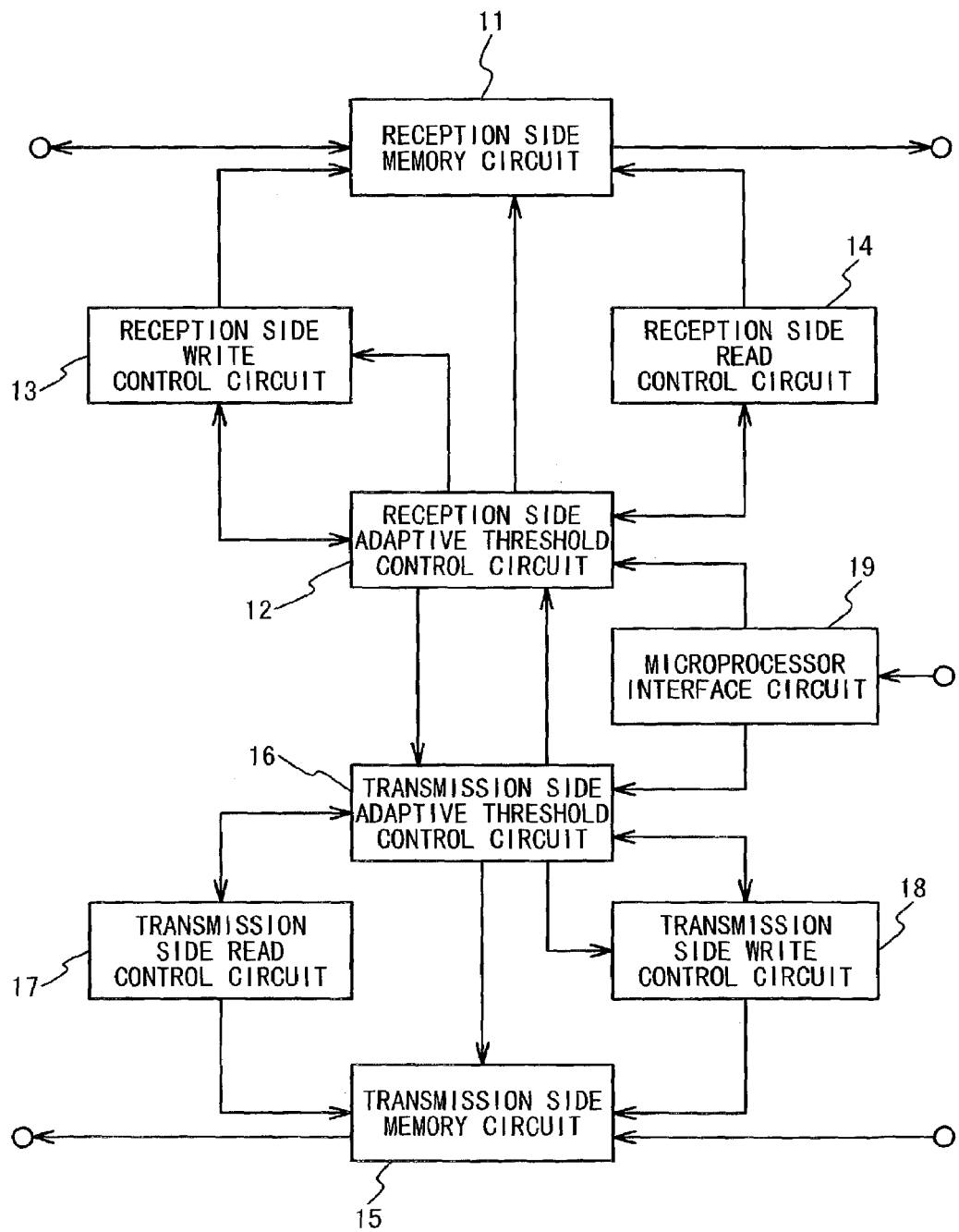
FIG. 8 is a block diagram showing the structure of a line processing section of the LAN relaying apparatus according to a second embodiment of the present invention.

FIG. 8 is a block diagram showing a structure of a line processing section of a LAN relaying apparatus according to the second embodiment of the present invention. Referring to FIG. 8, the line processing section of the LAN relaying apparatus according to the second embodiment of the present invention is composed of a reception side memory circuit 11, a reception side adaptive threshold control circuit 12, a reception side write control circuit 13, a reception side read control circuit 14, a transmission side memory circuit 15, a transmission side adaptive threshold control circuit 16, a transmission side read control circuit 17, a transmission side write control circuit 18 and a micro processor interface circuit 19. Their operations are further devised.

That is, a reception side adaptive difference write control signal is supplied from the reception side adaptive threshold control circuit 12 to the reception side write control circuit 13. A transmission side adaptive difference write control signal is supplied from the transmission side adaptive threshold control circuit 16 to the transmission side write control circuit 18. Both of the reception side and the transmission side carry out the adaptive difference control on the write access operation. Consequently, the memory access control can be carried out.

In the second embodiment, the line processing section of the LAN relaying apparatus changes the control targets of the reception side adaptive threshold control circuit 12 and the transmission side adaptive threshold control circuit 16 to the write accesses. Thus, it is possible to carry out the adaptive difference write access control of the memory circuit, which was conventionally difficult. Hence, it is possible to carry out the stable memory access control.

Figure 9:
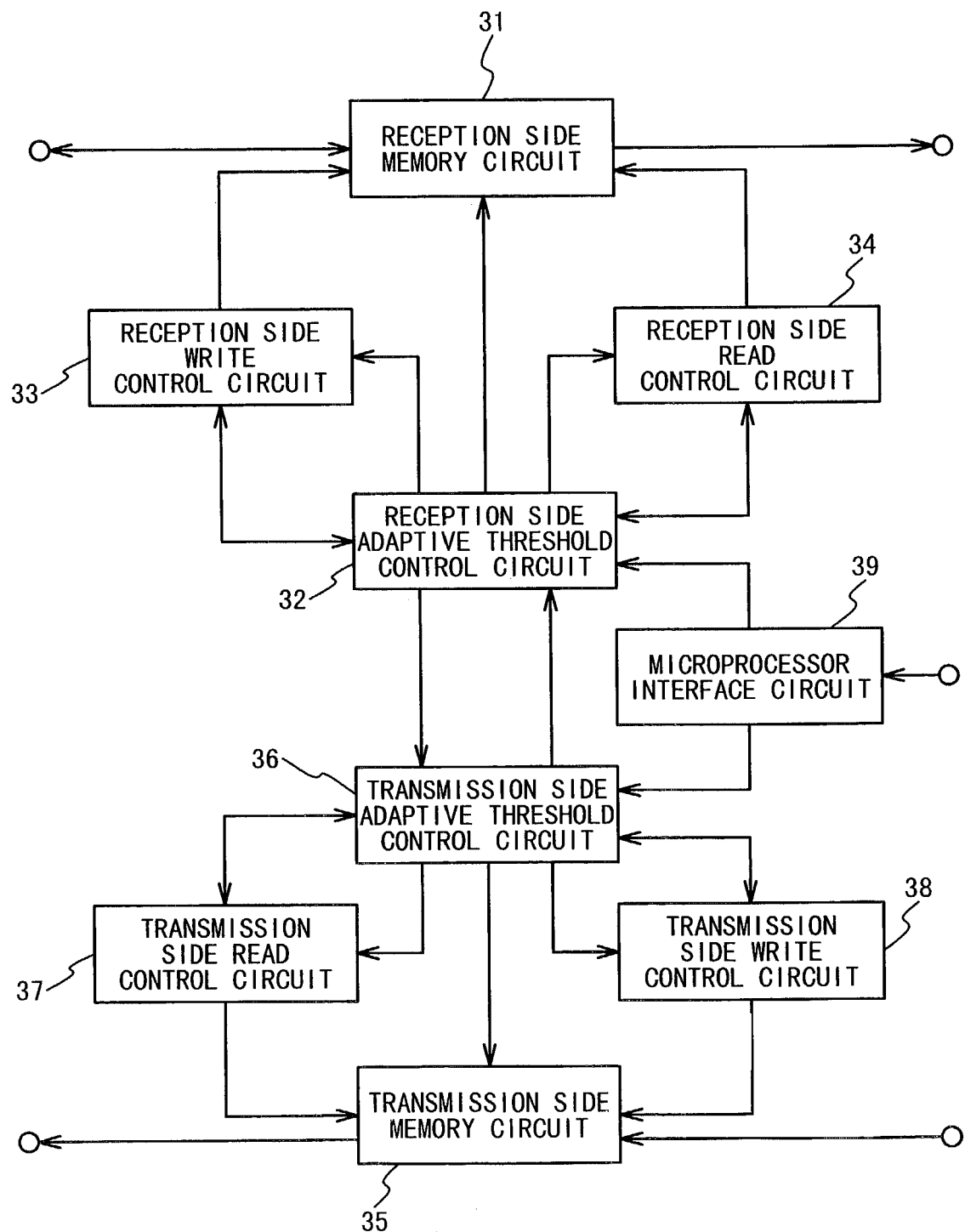
FIG. 9 is a block diagram showing the structure of a line processing section of the LAN relaying apparatus according to a third embodiment of the present invention.

FIG. 9 is a block diagram showing a structure of a line processing section of a LAN relaying apparatus according to the third embodiment of the present invention. Referring to FIG. 9, the line processing section of the LAN relaying apparatus according to the third embodiment of the present invention is composed of a reception side memory circuit 31, a reception side adaptive threshold control circuit 32, a reception side write control circuit 33, a reception side read control circuit 34, a transmission side memory circuit 35, a transmission side adaptive threshold control circuit 36, a transmission side read control circuit 37, a transmission side write control circuit 38 and a micro processor interface circuit 39, similarly to the above-mentioned embodiments of the present invention. Their operations are further devised.

That is, a reception side adaptive difference read control signal is supplied to the reception side read control circuit 34, and a reception side adaptive difference write control signal is supplied to the reception side write control circuit 33 from the reception side adaptive threshold control circuit 32. A transmission side adaptive difference read control signal is supplied from the transmission side adaptive threshold control circuit 36 to the transmission side read control circuit 37, and a transmission side adaptive difference write control signal is supplied from the transmission side adaptive threshold control circuit 36 to the transmission side write control circuit 38. Then, both of the reception side and the transmission side perform the adaptive difference control on the read access operation and the write access operation. Consequently, the memory access control can be carried out.

In the third embodiment, the line processing section of the LAN relaying apparatus changes the control targets of the reception side adaptive threshold control circuit 32 and the transmission side adaptive threshold control circuit 36 to the read access and the write access. Thus, it is possible to carry out the adaptive difference read/write access control of the memory circuit, which was conventionally difficult. Hence, it is possible to carry out the stable memory access control.

In the above embodiments, the pause frame is inserted in the transmission side memory circuit 5. However, the pause frame may be inserted in the reception side memory circuit 1, in the same manner as the transmission side.

As mentioned above, according to the LAN relaying apparatus of the present invention, the line processing section includes the reception side memory circuit and the transmission side memory circuit in order to relay the data signal between the line and the system. When comparing the read pointer and the write pointer to the reception side memory circuit and detecting the increase or the decrease from the preset reference pointer difference signal, the line processing section carries out the access control to the reception side memory circuit, based on the increase or the decrease. When comparing the read pointer and the write pointer to the transmission side memory circuit and detecting the increase or the decrease from the preset reference pointer difference signal, the line processing section carries out the access control to the transmission side memory circuit based on the increase or the decrease. Thus, it is possible to carry out the adaptive difference read access control of the memory circuit. Hence, it is possible to carry out the stable memory access control, and as necessary, the flow control function of the line processing section.

What is claimed is:

1. A LAN relaying apparatus comprising:
   a reception side memory circuit in which data is written from a first side based on a reception side write control signal and from which data is read out to a second side based on a reception side read control signal;
   a reception side write control circuit which has a reception side write pointer to said reception side memory circuit and which outputs said reception side write control signal to said reception side memory circuit for a first side write operation;
   a reception side read control circuit which has a reception side read pointer to said reception side memory circuit and which outputs said reception side read control signal to said reception side memory circuit for a second side read operation; and
   a reception side control circuit which receives said reception side write pointer from said reception side write control circuit and said reception side read pointer from said reception side read control circuit, determines a reception side pointer difference between said side reception side write pointer and said reception side read pointer, controls said reception side read control circuit to start said second side read operation when said reception side pointer difference is equal to a reception side first threshold held therein, and controls at least one of said reception side write control circuit and said reception side read control circuit such that at least one of said first side write operation and said second side read operation is carried out based on said reception side pointer difference, when said reception side pointer difference is not equal to said reception side first threshold after the start of said second side read operation.

2. The LAN relaying apparatus according to claim 1, wherein said reception side control circuit holds a reception side second threshold larger than said reception side first threshold, and outputs a first side flow control request signal such that a signal corresponding to said first side flow control request signal is transmitted to said first side for a first side flow control, when said reception side pointer difference is equal to or larger than said reception side second threshold.

3. The LAN relaying apparatus according to claim 2, wherein said reception side control circuit has a reception side third threshold larger than said reception side second threshold, and controls said reception side write control circuit and said reception side read control circuit to stop access to said reception side memory circuit when said pointer difference is equal to or larger than said reception side third threshold.

4. The LAN relaying apparatus according to claim 1, wherein said reception side control circuit provides a pause frame such that said pause frame is transmitted to said second side.

5. The LAN relaying apparatus according to claim 1, wherein said reception side control circuit controls only said reception side write control circuit when said reception side pointer difference is not equal to said reception side first threshold after the start of said second side read operation.

6. The LAN relaying apparatus according to claim 1, wherein said reception side control circuit controls only said reception side read control circuit when said reception side pointer difference is not equal to said reception side first threshold after the start of said second side read operation.

7. The LAN relaying apparatus according to claim 1, wherein said reception side control circuit controls both of said reception side write control circuit and said reception side read control circuit when said reception side pointer difference is not equal to said reception side first threshold after the start of said second side read operation.

8. The LAN relaying apparatus according to claim 3, wherein said reception side control circuit comprises:
  a comparing circuit which compares said reception side write pointer and said reception side read pointer to determine said reception side pointer difference;
  a holding circuit which holds said reception side first to third thresholds; and
  a reception side adaptive control circuit which controls at least one of said reception side write control circuit and said reception side read control circuit when said reception side pointer difference is not equal to said reception side first threshold after the start of said second side read operation such that at least one of said first side write operation and said second side read operation is carried out based on said reception side pointer difference, outputs said first side flow control request signal such that the signal corresponding to said first side flow control request signal is transmitted to said first side, when said pointer difference is equal to or larger than said reception side second threshold, and controls said reception side write control circuit and said reception side read control circuit to stop access to said reception side memory circuit when said pointer difference is equal to or larger than said reception side third threshold.

9. The LAN relaying apparatus according to claim 8, wherein said reception side control circuit further comprises:
  a reception side flow control circuit which generates a second side flow control instruction signal from a second side flow control request signal supplied thereto, and
  wherein said reception side adaptive control circuit writes the signal corresponding to said second side flow control instruction signal in said reception side memory circuit such that the signal corresponding to said second side flow control instruction signal is transmitted to said second side.

10. The LAN relaying apparatus according to claim 8, wherein said reception each of said reception side first to third thresholds is variable.

11. The LAN relaying apparatus according to claim 1, further comprising:
  a transmission side memory circuit in which data is written from said second side based on a transmission side write control signal and from which data is read out to said first side based on a transmission side read control signal;
  a transmission side write control circuit which has a transmission side write pointer to said transmission side memory circuit and which outputs said transmission side write control signal to said transmission side memory circuit for a second side write operation;
  a transmission side read control circuit which has a reception side read pointer to said transmission side memory circuit and which outputs said transmission side read control signal to said transmission side memory circuit for a first side read operation;
  a transmission side control circuit which receives said transmission side write pointer from said transmission side write control circuit and said transmission side read pointer from said transmission side read control circuit, determines a transmission side pointer difference between said side transmission side write pointer and said transmission side read pointer, controls said transmission side read control circuit to start said first side read operation when said transmission side pointer difference is equal to a transmission side first threshold held therein, and controls at least one of said transmission side write control circuit and said transmission side read control circuit such that at least one of said second side write operation and said first side read operation is carried out based on said transmission side pointer difference, when said transmission side pointer difference is not equal to said transmission side first threshold after the start of said first side read operation.

12. The LAN relaying apparatus according to claim 11, wherein said transmission side control circuit holds a transmission side second threshold larger than said transmission side first threshold, and outputs a second side flow control request signal such that a signal corresponding to said second side flow control request signal is transmitted to said second side for a second side flow control, when said transmission side pointer difference is equal to or larger than said transmission side second threshold.

13. The LAN relaying apparatus according to claim 12, wherein said transmission side control circuit has a transmission side third threshold larger than said transmission side second threshold, and controls said transmission side write control circuit and said transmission side read control circuit to stop access to said transmission side memory circuit when said pointer difference is equal to or larger than said transmission side third threshold.

14. The LAN relaying apparatus according to claim 11, wherein said transmission side control circuit provides a pause frame such that said pause frame is transmitted to said first side.

15. The LAN relaying apparatus according to claim 11, wherein said transmission side control circuit controls only said transmission side write control circuit when said transmission side pointer difference is not equal to said transmission side first threshold after the start of said first side read operation.

16. The LAN relaying apparatus according to claim 11, wherein said transmission side control circuit controls only said transmission side read control circuit when said transmission side pointer difference is not equal to said transmission side first threshold after the start of said first side read operation.

17. The LAN relaying apparatus according to claim 11, wherein said transmission side control circuit controls both of said transmission side write control circuit and said transmission side read control circuit when said transmission side pointer difference is not equal to said transmission side first threshold after the start of said first side read operation.

18. The LAN relaying apparatus according to claim 13, wherein said transmission side control circuit comprises:
   a comparing circuit which compares said transmission side write pointer and said transmission side read pointer to determine said transmission side pointer difference;
   a holding circuit which holds said transmission side first to third thresholds; and
   a transmission side adaptive control circuit which controls at least one of said transmission side write control circuit and said transmission side read control circuit when said transmission side pointer difference is not equal to said transmission side first threshold after the start of said first side read operation such that at least one of said first side write operation and said second side read operation is carried out based on said transmission side pointer difference, outputs said first side flow control request signal such that the signal corresponding to said second side flow control request signal is transmitted to said second side, when said pointer difference is equal to or larger than said transmission side second threshold, and controls said transmission side write control circuit and said transmission side read control circuit to stop access to said transmission side memory circuit when said pointer difference is equal to or larger than said transmission side third threshold.

19. The LAN relaying apparatus according to claim 18, wherein said transmission side control circuit further comprises:
   a transmission side flow control circuit which generates a first side flow control instruction signal from a first side flow control request signal supplied thereto, and
   wherein said transmission side adaptive control circuit writes the signal corresponding to said first side flow control instruction signal in said transmission side memory circuit such that the signal corresponding to said first side flow control instruction signal is transmitted to said first side.

20. The LAN relaying apparatus according to claim 8, wherein said transmission each of said transmission side first to third thresholds is variable.

* * * * *